(12) United States Patent
Goto et al.

(10) Patent No.: US 7,594,946 B2
(45) Date of Patent: Sep. 29, 2009

(54) AIR-CLEANER FILTER MATERIAL FOR INTERNAL COMBUSTION ENGINE AND AIR-CLEANER ELEMENT

(75) Inventors: Sadahito Goto, Otsu (JP); Yasunori Matsubara, Wako (JP); Yoshihiko Kubo, Wako (JP)

(73) Assignees: Toyo Boseki Kabushiki Kaisha, Osaka (JP); Honda Motor Co., Ltd., Tokyo (JP)

( * ) Notice: Subject to any disclaimer, the term of this patent is extended or adjusted under 35 U.S.C. 154(b) by 485 days.

(21) Appl. No.: 11/499,506

(22) Filed: Aug. 4, 2006

(65) Prior Publication Data

US 2007/0028573 A1 Feb. 8, 2007

(30) Foreign Application Priority Data

Aug. 8, 2005 (JP) ............................ 2005-228994

(51) Int. Cl.
*B01D 46/00* (2006.01)

(52) U.S. Cl. ............................ 55/485; 55/486; 55/487; 55/521; 55/527

(58) Field of Classification Search ................ 210/348; 55/382, 486–488, 521, 527, 528, 385.3, 485
See application file for complete search history.

(56) References Cited

U.S. PATENT DOCUMENTS

| 6,039,839 | A | * | 3/2000 | Trokhan et al. | ............. | 162/116 |
| 2004/0211160 | A1 | * | 10/2004 | Rammig et al. | ............... | 55/382 |
| 2004/0241415 | A1 | * | 12/2004 | Wadahara et al. | ........ | 428/298.1 |

FOREIGN PATENT DOCUMENTS

| JP | 53-33787 B | 9/1978 |
| JP | 04-059007 A | 2/1992 |
| JP | 10-180023 A | 7/1998 |

* cited by examiner

*Primary Examiner*—Duane Smith
*Assistant Examiner*—Christopher P Jones
(74) *Attorney, Agent, or Firm*—Leydig, Voit & Mayer, Ltd.

(57) ABSTRACT

The invention provides an air-cleaner filter material for an internal combustion engine, which comprises a dust-collecting layer comprising a melt-blown nonwoven fabric having a maximum pore size of 100 μm or less and a dust-retaining layer arranged upstream of the dust-collecting layer and laminated integrally by heat fusion with, the dust-collecting layer, comprising a thermal-bond nonwoven fabric having fibers with two or more fiber diameters arranged in the order of increasing the proportion of smaller fiber diameter in the direction from the upstream to downstream side, wherein the in-plane of the filter material has a portion of high fiber density and a portion of low fiber density, and the portion of high fiber density occurs in a lattice pattern.

4 Claims, 1 Drawing Sheet

AIR-CLEANER FILTER MATERIAL FOR INTERNAL COMBUSTION ENGINE AND AIR-CLEANER ELEMENT

BACKGROUND OF THE INVENTION

1. Field of the Invention

The present invention relates to an air-cleaner filter material for an internal combustion engine, for removing dust etc. from the air, for use in introducing fresh air, which is fit in an air inlet of an internal combustion engine such as an automobile and a general-purpose engine, as well as an air-cleaner element using the same.

2. Description of the Related Art

The air introduced into an internal combustion engine such as in an automobile, a general-purpose engine etc. is clean air made free from dust through an air cleaner, and high efficiency of collection of dust and high capacity for retaining dust are required of the air cleaner. Particularly in recent years, a long-lasting air cleaner having high capacity for retaining dust with less frequency of exchange of the air-cleaner is strongly desired from the viewpoint of reducing waste. To cope with the problem, a density-gradient filter material in a wet or dry system is proposed.

For example, there is disclosed a density-gradient filter material composed of a wet nonwoven fabric having a fiber layer consisting of heat-adhesive fibers and crimped fibers, wherein a resin adhesive is used (see, for example, JP-A No. 4-59007). On one hand, a density-gradient filter composed of a dry nonwoven fabric produced by subjecting fibers containing heat fusion fibers to needle-punching and then thermally treating the fibers is disclosed (see, for example, JP-B No. 53-33787 and JP-A No. 10-180023).

JP-A No. 4-59007 supra proposes a density-gradient filter material in a wet system using heat-adhesive fibers and crimped fibers, but a resin adhesive used in the filter material reduces a space for retaining dust among the fibers, thus shortening the life of an air cleaner using the same. The diameters of the fibers and the weight of the nonwoven fabric are not referred to therein, and the deformation and reduced duration of the filter material attributable to a reduction in strength upon pleating it in an element form are problematic.

JP-B No. 53-33787 and JP-A No. 10-180023 supra disclose respectively a density-gradient nonwoven fabric produced by subjecting fibers containing heat fusion fibers to needle-punching, but needle-punching allows a large amount of minute holes to occur in a dense layer of the fibers, thus causing a problem of re-scattering of dust once captured. There is also a problem that the strength of the filter material is reduced by needle-punching, to permit deformation to occur upon retaining a large amount of dust thereby reducing the capacity for retaining dust.

As described above, a long-lasting filter material sufficiently maintaining the strength of the filter material, suppressing the reduction, by deformation, of the capacity for retaining dust, and having the optimum fiber density gradient is still not obtained at present.

SUMMARY OF THE INVENTION

The object of the present invention is to provide an air-cleaner filter material for an internal combustion engine, which has a long life with high rigidity without deformation or filter material breakage upon loading with dust, is free of re-scattering of dust, and hardly causes environmental contamination at the time of production, as well as an air-cleaner element using the same.

DISCLOSURE OF THE INVENTION

Means for Solving the Problems

The object described above can be achieved by the present invention described below.

That is, the air-cleaner filter material of the present invention for an internal combustion engine (hereinafter referred to sometimes as "the filter material of the present invention") is an air-cleaner filter material for an internal combustion engine, which comprises a dust-collecting layer consisting of a melt-blown nonwoven fabric having a maximum pore size of 100 µm or less and a dust-retaining layer arranged upstream of, and laminated integrally by heat fusion with, the dust-collecting layer and consisting of a thermal-bond nonwoven fabric having fibers with two or more fiber diameters of 10 µm to 80 µm arranged in the order of increasing the ratio of the smaller fiber diameter in the direction from the upstream to downstream side, and having an average fiber diameter of 30 µm to 60 µm and a fiber areal weight of 80 to 300 $g/m^2$, wherein the in-plane of the filter material has portions of high and low fiber density, and the portion of high fiber density occurs in a lattice pattern.

Because the in-plane of the filter material has portions of high and low fiber density and the portion of high fiber density occurs in a lattice pattern, the filter material of the present invention has a long life with high rigidity without deformation or filter material breakage upon loading with dust. The filter material has been laminated integrally by heat fusion without using needle-punching, and is thus free of re-scattering of dust and hardly causes environmental contamination at the time of manufacturing the same. Because of the above-shown maximum pore size and production method of the dust-collecting layer and the above-shown average fiber diameter, fiber areal weight, and fiber diameter change of the dust-retaining layer, the filter material of the present invention has high collection efficiency, shows a long interval time and a large amount of dust caught, and exhibits an extremely long life in spite of low air-flow resistance.

In the above description, it is preferable that the ratio of the thickness of the portion of high fiber density to the thickness of the portion of low fiber density is from 0.5:1.0 to 0.95:1.0, the ratio of the area of the portion of high fiber density to the area of the portion of low fiber density is from 1.0:0.5 to 1.0:5, and the thickness of the portion of low fiber density is 0.3 to 3.0 mm. The effective filtration area can thereby be sufficiently maintained, while the rigidity of the filter material can be improved and the amount of dust retained can be sufficiently maintained.

The air-cleaner element of the present invention comprises a filter material obtained by pleating the above-described air-cleaner filter material for an internal combustion engine.

The air-cleaner element of the present invention makes use of the filter material of the present invention, and can thus serve as an air-cleaner element which has a long life with high rigidity without deformation or filter material breakage upon loading with dust, is free of re-scattering of dust, and hardly causes environmental contamination at the time of manufacturing the same.

BRIEF DESCRIPTION OF THE INVENTION

Figure 1:
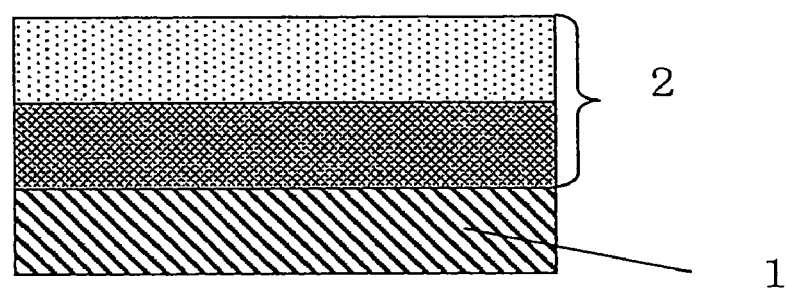
FIG. 1 is a sectional view showing one example of the air-cleaner filter material for an internal combustion engine according to the present invention.
Figure 2:
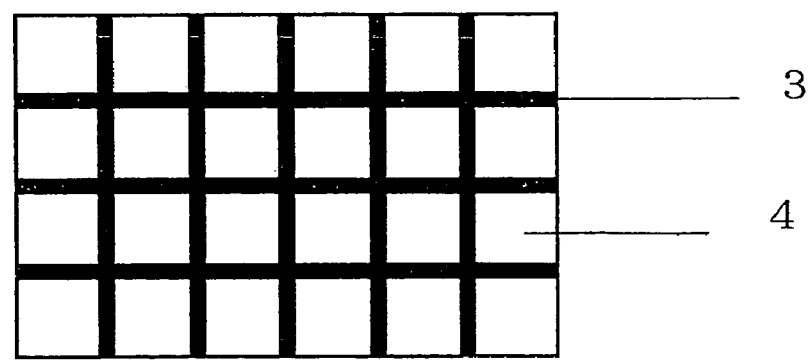
FIG. 2 is a plan view showing one example of the air-cleaner filter material for an internal combustion engine according to the present invention.

Hereinafter, the mode for carrying out the invention is described by reference to the drawings. FIG. 1 is a sectional view showing one example of the air-cleaner filter material for an internal combustion engine according to the present invention, and FIG. 2 is a plan view showing one example of the air-cleaner filter material for an internal combustion engine according to the present invention.

As shown in FIG. 1, the filter material of the present invention comprises a dust-collecting layer 1 consisting of a melt-blown nonwoven fabric and a dust-retaining layer 2 consisting of a thermal bond nonwoven fabric. The dust-retaining layer 2 is arranged upstream of, and laminated integrally by heat fusion with, the dust-collecting layer 1. The dust-retaining layer 2 may be composed of a plurality of layers.

The maximum pore size of the dust-collecting layer 1 should be 100 µm or less. As used herein, the maximum pore size refers to a size determined by ASTM F316-86 Bubble Point Test Method. The filter material is required to have 99.9% or more dust collection efficiency when examined using 8 kinds of dusts according to JIS Z 8901, and as a result of detailed examination of the particle-size distribution of the above dusts, the maximum pore size of the filter material, and the collection efficiency, it was revealed that a melt-blown nonwoven fabric having a maximum pore size of 100 µm or less, preferably 70 µm or less, can be used for achieving sufficiently high collection efficiency and also for preventing re-scattering of dust. When the maximum pore size is greater than 100 µm, dust leak and dust re-scattering become significant and the collection efficiency is lowered.

With respect to a manufacturing method of a nonwoven fabric, it is required to be a melt-blown nonwoven fabric from the viewpoint of thickness, uniform fiber distribution and manufacturing cost. Although the fiber areal weight and material of the melt-blown nonwoven fabric are not particularly limited, a melt-blown nonwoven fabric having a fiber areal weight of 10 to 100 g/m$^2$ and made of general-purpose resin such as polyolefin, polyester etc. can be widely used. The fiber diameter is preferably 1.0 to 10 µm in order to realize the collection efficiency described above. When the collection of fine dust of 1 µm or less is necessary, the function of collection with electrostatic force may be added to the fabric by electrification.

In the dust-retaining layer 2 of the present invention, the fibers with two or more fiber diameters of 10 µm to 80 µm should be arranged in the order of increasing the ratio of the smaller fiber diameter in the direction from the upstream to downstream side of the filter material. This change in fiber diameter may be continuous or stepwise. The dust-retaining layer is arranged upstream of the dust-collecting layer to capture and retain dust having a relatively large particle diameter in the direction of depth of the filter material thereby suppressing the increase, by clogging, in the air-flow resistance of the dense dust-collecting layer, and is having a function of reinforcing the filter material to suppress the deformation of the filter material upon an increase in air-flow resistance or upon loading with temperature or humidity thereby suppressing a rapid increase in air-flow resistance.

The fiber diameters of the dust-retaining layer 2 should be composed with two or more fiber diameters of 10 µm to 80 µm, or more preferably those of 15 µm to 70 µm, further more preferably those of 20 µm to 60 µm. When fibers of less than 10 µm in fiber diameter are used, the fiber structure becomes so dense that the space for retaining dust is reduced to shorten the life of the filter material, and the stiffness of the sheet is reduced thus leading to deformation upon an increase in air-flow resistance. When fibers of greater than 80 µm in fiber diameter are used, the space among the fibers become too large to retain dust, and therefore, almost all dust is collected on the dust-collecting layer thus reducing the life of the filter material. When the fiber diameter is so great, the fibers are hardly formed into a fiber sheet by carding or the like and made uneven to deteriorate operativeness.

The fibers with two or more fiber diameters should be arranged in the order of increasing the ratio of the smaller fiber diameter in the direction from the upstream to downstream side. When the filter material is loaded with dust having a broad particle-size distribution, the gradient of fiber diameter ratio allows dust of larger particle diameter to be collected and retained in an upstream area of the filter material and dust of smaller particle diameter to be collected and retained in a downstream area of the filter material, thus permitting the dust to be retained efficiently throughout the fibers in the direction of thickness of the filter material thereby significantly reducing the increase, by clogging, in the air-flow resistance of the dust-collecting layer. On the other hand, when the ratio of fibers with smaller diameters is increased in the direction from the upstream to downstream side, clogging with dust occurs at the upstream side, so the fibers in the direction of thickness of the filter material cannot be efficiently utilized, thus reducing the life of the filter material.

Although the method of changing the ratio of fiber diameters is not particularly limited, a method wherein webs different in fiber diameter are laminated with each other and then thermally contact-bonded all at once up to a predetermined thickness is preferably used from the viewpoint of uniformity of qualities and processing rate. There is also a method which comprises preparing nonwoven fabrics different in fiber diameter and then laminating them via an adhesive or by mechanical entanglement to change the gradient of fiber diameters, but this method is not preferable because clogging with dust may occur due to the adhesive in the interfaces in which the layers are contacted with one another, or dust leak may occur through fine holes formed upon lamination by needle punching or water punching.

The average fiber diameter of the dust-retaining layer 2 should be 30 µm to 60 µm. When the average fiber diameter of the dust-retaining layer is less than 30 µm, the fiber structure even added with a constant gradient of fiber diameters becomes so dense that while the dust collection efficiency of the retaining layer is improved, the space for retaining dust is reduced to shorten the life of the filter material. Further, the stiffness of the sheet is reduced thus leading to deformation upon an increase in air-flow resistance. On the other hand, when the average fiber diameter is greater than 60 µm, the space among the fibers becomes too large to retain dust, and therefore, almost all dust is collected in the dust-collecting layer, resulting in reduction of the life of the filter material. Further, the thickness of the filter material becomes so great that the filter material increases structural air-flow resistance particularly upon formation into an element by pleating.

The fiber areal weight of the dust-retaining layer 2 should be 80 to 300 g/m$^2$, more preferably 100 to 250 g/m$^2$. When the fiber areal weight is less than 80 g/m$^2$, it is not preferable because the amount of dust retained is decreased and the strength of the filter material is lowered. When the fiber areal weight is higher than 300 g/m$^2$, it is not preferable because the thickness of the filter material is increased, and the filter material increases structural air-flow resistance particularly upon formation into an element by pleating. The thickness of the dust-retaining layer 2 is preferably 0.5 to 3.0 mm in order to achieve sufficient capacity to retain dust.

The fibers constituting the dust-retaining layer 2 is a thermal bond nonwoven fabric consisting of heat fusion fibers, and should be laminated integrally by heat fusion with the dust-collecting layer. The dust-retaining layer consists of heat fusion fibers to be formed into a nonwoven fabric by thermal bonding, whereby the respective fibers are bonded strongly by heat fusion to increase the strength, and this thermal bonding does not require a binder resin and is thus free of clogging among the fibers which can be caused where a binder resin is used. Because of the absence of a resin waste in production of the layer, the process can be carried out cleanly. In addition, the dust-retaining layer can be laminated on the dust-collecting layer by the ability of heat fusion of the dust-collecting layer, thus making use of a binder unnecessary in adhesion between the layers. It is not preferable because when needle punching, which does not require a binder resin either, is used in adhesion between the layers, dust leak occurs through needle traces generated in the dust-collecting layer.

The usable heat fusion fibers are those having a core/sheath structure or a side-by-side structure, and the material thereof is not particularly limited, but polyethylene/polypropylene-based fibers or low-melting polyester/polyester-based fibers are preferable for the strength of the filter material and in an environmental resistance test. Further, the fibers can be mixed or subjected to post-treatment with an antibacterial agent, an anti-fungal agent, an antiviral agent, an antiallergenic agent, a flame-retardant, a water repellant etc. in order to confer such additional functions thereon.

As shown in FIG. 2, the filter material of the present invention is characterized in that the in-plane of the filter material has a portion 3 of high fiber density and a portion 4 of low fiber density in order to further improve rigidity, wherein the portion 3 of high fiber density occurs in a lattice pattern. The portions different in fiber density in the in-plane of the filter material may be arranged on at least one side of the filter material, but the whole of the filter material in the direction of thickness may have the portions different in fiber density.

The shape of each of the units forming the lattice may be a lozenge, parallelogram and triangle without limitation to a square or rectangle. That is, the portion 3 of high fiber density may be arranged toward any directions insofar as it is two-dimensionally arranged.

By allowing the portion of high density to be present in a part of the filter material, the filter material can be added with further rigidity to prevent deformation upon loading with dust and simultaneously made excellent in processability with bendability upon pleating into an element.

The portion 3 of high fiber density occurs preferably in a lattice pattern. That is, the portion of high density occurs continuously in a linearly crossed form in the longer direction, width direction etc. of the filter material thereby significantly improving the rigidity of the filter material and preventing the deformation of the filter material upon loading with high pressure. When the portion of high density occurs in a dotted state or in a sea/island state, the high-strength portion of high density occurs intermittently, and thus the filter material, particularly in a pleated state, becomes deficient in strength.

The method of forming the portion 3 of the high fiber density in a lattice pattern is not particularly limited, and examples of that method include a method wherein a filter material having the dust-retaining layer and the dust-collecting layer laminated with each other, before or after bonding by heat fusion, is sandwiched between nets having predetermined lattice size and then pressed under heating to produce portions of low density and high density in a lattice pattern.

The ratio of the thickness (total thickness) of the portion 3 of high fiber density to the thickness (total thickness) of the portion 4 of low fiber density is preferably from 0.5:1.0 to 0.95:1.0, more preferably 0.6:1.0 to 0.90:1.0. When the ratio of the thickness of the portion 3 of high fiber density to the thickness of the portion 4 of low density is lower than 0.5, the fiber density becomes so high that air hardly passes therethrough, and thus the effective filtration area is reduced and the amount of dust retained tends to be decreased. When the ratio of the thickness of the portion 3 of high fiber density to the thickness of the portion 4 of low fiber density is higher than 0.95, the effect of the portion 3 of high fiber density on improvement of the rigidity of the filter material is made lower.

The ratio of the area of the portion 3 of high fiber density to the area of the portion 4 of low fiber density is from 1.0:0.5 to 1:5, more preferably 1:0.6 to 1:3. When the ratio of the area of the portion 4 of low fiber density to the area of the portion 3 of high fiber density is lower than 0.5, the effective filtration area is reduced, while when the above area ratio is higher than 5, the effect on improvement of the rigidity of the filter material tends to be insufficient.

The thickness (total thickness) of the portion 4 of low fiber density is preferably 0.3 mm to 3.0 mm, more preferably 0.5 mm to 2.0 mm. When the thickness of the portion 4 of low fiber density is less than 0.3 mm, the space for retaining dust in the filter material is small, and thus the amount of dust retained tends to be not sufficient, while when the thickness of the portion 4 of low fiber density is greater than 3.0 mm, the distance among convex portions, made by pleating, of the fiber material tends to be decreased thereby significantly increasing the structural air-flow resistance of the fiber material as an element.

The filter material of the present invention has a long life with high rigidity without deformation or filter material breakage upon loading with dust, and hardly causes environmental contamination at the time of producing the same, and can thus be used in an air cleaner in an automobile, a general-purpose engine, etc. The filter material is excellent in pleating processability and has excellent shape retention and environmental resistance in a pleated form, and can be used as a long-lasting air cleaner element with less increase in air-flow resistance upon loading with dust.

Accordingly, the air-cleaner element of the present invention is characterized in that it comprises a filter material obtained by pleating the air-cleaner filter material for an internal combustion engine according to the present invention. The filter material of the present invention is hardly deformed during use without using a pitch-fixing part except for a frame forming the outer periphery of the pleat filter and is thus preferable as an air-cleaner element in a chrysanthemum form using a metal plate frame in the absence of a pitch-fixing part.

EXAMPLES

Hereinafter, the present invention is described in more detail by reference to the Examples, but the following examples are not intended to limit the present invention, and any designs and modifications in accordance with the gist in this specification fall under the scope of the present invention. Numerical values in the Examples are those determined by the following methods.

(Air-Flow Resistance and Collection Efficiency)
Determined according to JIS D 1612 (1989).

(Interval Time, Amount of Dust Caught, Pleat Shape, Dust Leak)

In an atmosphere wherein 8 kinds of dust according to JIS Z 8901 were contained at a dust density of 5 to 10 mg/m$^3$, an engine fit with a test filter was operated and the time having elapsed until the engine underwent abnormal revolution was determined as interval time. The 8 kinds of dust were supplied whenever necessary to keep the dust at the density described above. The difference in weight between the filter before the test and the filter after underwent abnormal revolution was determined as the amount of dust caught. Further, the pleat form and the dust leak into the clean side were confirmed by visual observation.

Example 1

A web (fiber areal weight 60 g/m$^2$) having a core/sheath structure with a fiber diameter of 20 μm (core, polypropylene; sheath, polyethylene) and a web (fiber areal weight 120 g/m$^2$) of heat fusion fibers having a core/sheath structure with a fiber diameter of 50 μm (core, polypropylene; sheath, polyethylene) were stacked on a melt-blown nonwoven fabric of polypropylene having a fiber diameter of 4 μm (maximum pore size 45 μm, fiber areal weight 40 g/m$^2$), and the resulting laminate was sandwiched vertically between nets in a lattice pattern and then thermally contact-bonded at a temperature of 140° C. for 1 minute. Then the average fiber diameter of the two heat-fused webs was 40 μm, and the fiber areal weight of the resulting dust-retaining layer was 180 g/m$^2$.

The thickness of the portion of high fiber density was 1.2 mm, the thickness of low fiber density was 1.4 mm, and the ratio of the area of the portion of high fiber density to the area of the portion of low fiber density was 1:1.8. The filter material thus produced was pleated to give a product having 50 convex portions wherein the height of the convex portion was 19 mm and the width of the filter material was 85 mm. This product was molded in a chrysanthemum form to give an air-cleaner element. The outer diameter of the air-cleaner element in a chrysanthemum form was 104 mmϕ, and the inner diameter thereof was 85 mmϕ.

Comparative Example 1

A single-layer filter material in a wet system (fiber areal weight 184 g/m$^2$, thickness 0.8 mm, maximum pore size 61 μm) fit into a commercial general-purpose engine was pleated to give a product having 57 convex portions wherein the height of the convex portion was 19 mm and the width of the filter material was 85 mm, and this product was molded in a chrysanthemum form to give an air-cleaner element having the same size as in Example 1.

Comparative Example 2

A filter material (thickness 1.4 mm) was prepared under the same conditions as in Example 1 except that without using the nets in a lattice pattern, the laminate was thermally contact-bonded such that the thickness of the in-plane of the resulting filter material was made uniform, to give an air-cleaner element in a chrysanthemum form.

The evaluation results in Example 1 and Comparative Examples 1 to 2 are shown in Table 1. Any cleaner elements were evaluated after covering, with a punching metal, the outer periphery of the pleat filter material in a chrysanthemum form and further winding an urethane sponge (a product corresponding to HR30, 10 mm, manufactured by Bridgestone Corporation) on the outer periphery thereof.

TABLE 1

|  | Example 1 | Comparative Example 1 | Comparative Example 2 |
| --- | --- | --- | --- |
| Air-flow resistance [Pa] | 0.27 | 0.33 | 0.27 |
| Collection efficiency [%] | 99.98 | 99.98 | 99.51 |
| Interval time ratio | 2.9 | 1.0 | 1.7 |
| Amount of dust caught [g] | 77.8 | 23.4 | 41.5 |
| Pleat deformation | Absent | Absent | Present |
| Dust leak | Absent | Absent | Present |
| Number of convex portions of the filter material | 50 convex portions | 57 convex portions | 50 convex portions |

Table 1 reveals that the element of the invention in Example 1 has high collection efficiency in spite of low air-flow resistance, and shows a very long life as evidenced by its interval time and the amount of dust caught therein, both of which are about 3 times as high as those in Comparative Example 1. That is, the frequency of exchange of the element during use in an engine can be significantly reduced. The rigidity of the filter material is high and the deformation or dust leak of the filter material upon loading with dust are not observed, thus indicating that the long life of the filter material is achieved by preventing the effective filtration area from being reduced upon deformation. Because the number of convex portions in the filter material, that is, the amount of filter material to be used, of the invention can be smaller than in the filter material in Comparative Example 1, the cost of the filter material and the number of production steps can be reduced.

In Comparative Example 2 where the portion of high fiber density is not arranged in the in-plane of the filter material, the filter material is poor in rigidity so that due to deformation upon loading with dust, the filter material undergoes dust leak and further shows significant reduction in both the interval time and the amount of dust caught.

The invention claimed is:

1. An air-cleaner filter material for an internal combustion engine, which comprises
    (a) a dust-collecting layer comprising a melt-blown nonwoven fabric having a maximum pore size of 100 μm or less, which is sufficient to remove dust introduced into the air by an internal-combustion engine, and
    (b) a dust-retaining layer comprising a thermal-bond nonwoven fabric
        (i) comprising two or more webs comprising fibers with a core/sheath structure and different fiber diameters of 10 μm to 80 μm,
        wherein the webs are arranged in the order of increasing the proportion of smaller fiber diameter in the direction from the upstream to downstream side, and
        wherein the webs are thermally contact-bonded to a predetermined thickness, and
        (ii) having an average fiber diameter of 30 μm to 60 μm and a fiber areal weight of 80 to 300 g/m$^2$, which fiber areal weight decreases in the direction from the upstream to downstream side,
    wherein the dust-retaining layer is arranged upstream of the dust-collecting layer and laminated integrally by heat fusion with the dust-collecting layer, and
    wherein the in-plane of the filter material has portions of high and low fiber density, and the portion of high fiber density occurs in a lattice pattern.

2. The air-cleaner filter material for an internal combustion engine according to claim 1, wherein the ratio of the thickness of the portion of high fiber density to the thickness of the portion of low fiber density is from 0.5:1.0 to 0.95:1.0, the ratio of the area of the portion of high fiber density to the area of the portion of low fiber density is from 1.0:0.5 to 1.0:5, and the thickness of the portion of low fiber density is 0.3 mm to 3.0 mm.

3. An air-cleaner element comprising a filter material produced by pleating the air-cleaner filter material for an internal combustion engine according to claim 1.

4. An air-cleaner element comprising a filter material produced by pleating the air-cleaner filter material for an internal combustion engine according to claim 2.

* * * * *

UNITED STATES PATENT AND TRADEMARK OFFICE
CERTIFICATE OF CORRECTION

PATENT NO. : 7,594,946 B2  Page 1 of 1
APPLICATION NO. : 11/499506
DATED : September 29, 2009
INVENTOR(S) : Goto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 541 days.

Signed and Sealed this

Twenty-eighth Day of September, 2010

David J. Kappos
*Director of the United States Patent and Trademark Office*